May 12, 1942.  E. G. MUELLER  2,282,374
BRAKE RIGGING
Filed May 15, 1941  4 Sheets-Sheet 1

INVENTOR
Emil G. Mueller
BY
HIS ATTORNEY

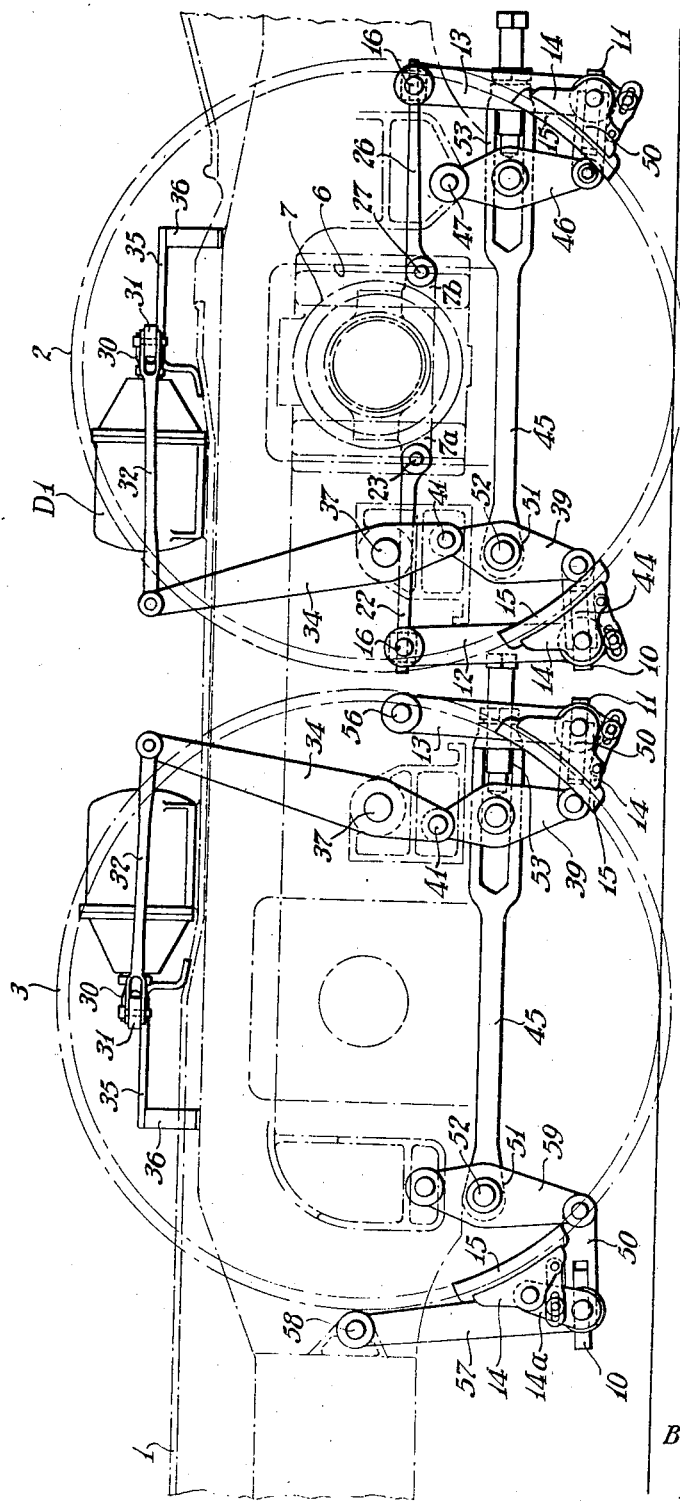

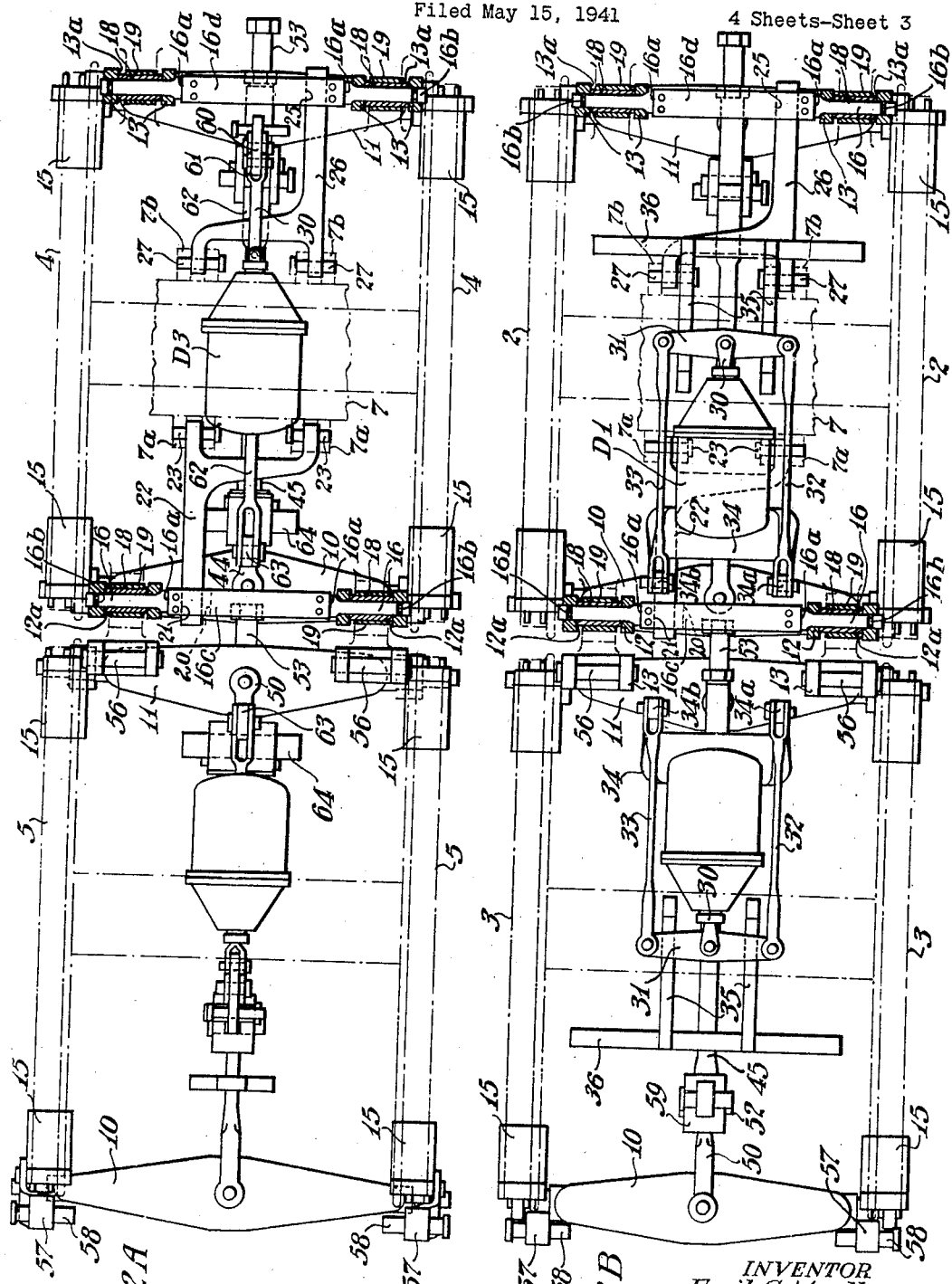

May 12, 1942.  E. G. MUELLER  2,282,374
BRAKE RIGGING
Filed May 15, 1941  4 Sheets-Sheet 4

INVENTOR
Emil G. Mueller
BY
HIS ATTORNEY

Patented May 12, 1942

2,282,374

UNITED STATES PATENT OFFICE 2,282,374

BRAKE RIGGING

Emil G. Mueller, Churchill Borough, Pa., assignor to The American Brake Company, Swissvale, Pa., a corporation of Missouri Application May 15, 1941, Serial No. 393,567

11 Claims. (Cl. 188—56)

My invention relates to brake rigging for railway rolling stock, and particularly to brake rigging for the driving wheels of locomotives.

One object of my invention is to provide brake rigging which can be satisfactorily mounted within the limited space available on a modern high speed locomotive without interference from or with the other parts of the locomotive.

Other objects and characteristic features of my invention will appear as the description proceeds.

The present application is a division of my copending application for Letters Patent of the United States, Serial No. 248,652, filed on December 31, 1938, Patent No. 2,258,337, October 7, 1941 for Brake rigging.

I shall describe one form of brake rigging embodying my invention, and shall then point out the novel features thereof in claims.

Figure 1A:
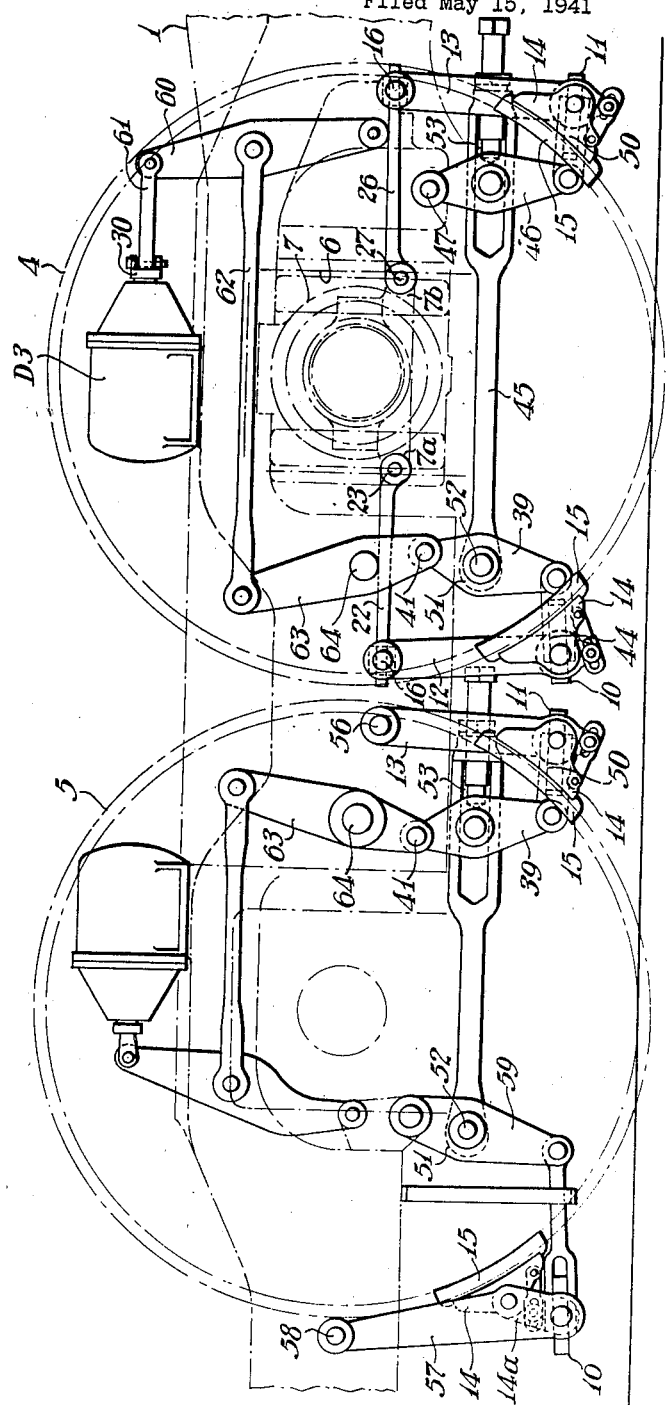
Figure 3:
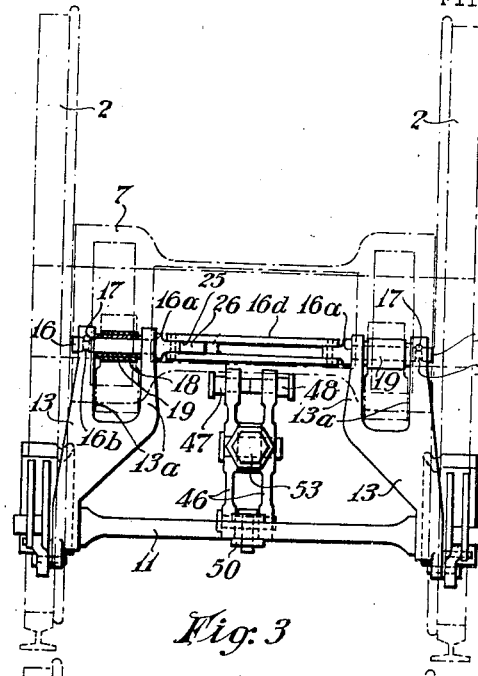
Figure 4:
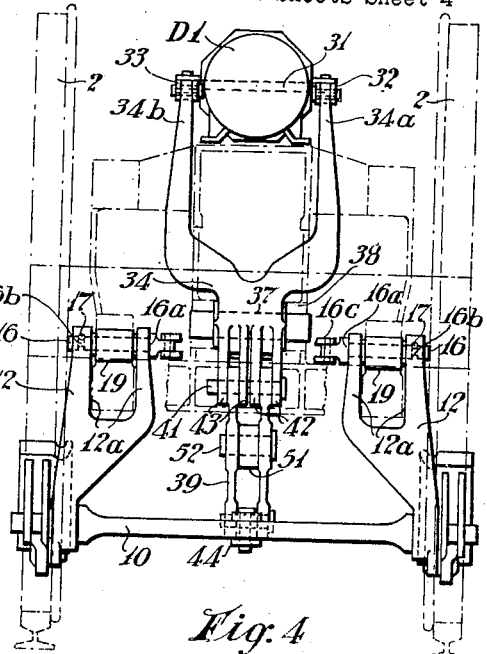
Figure 6:
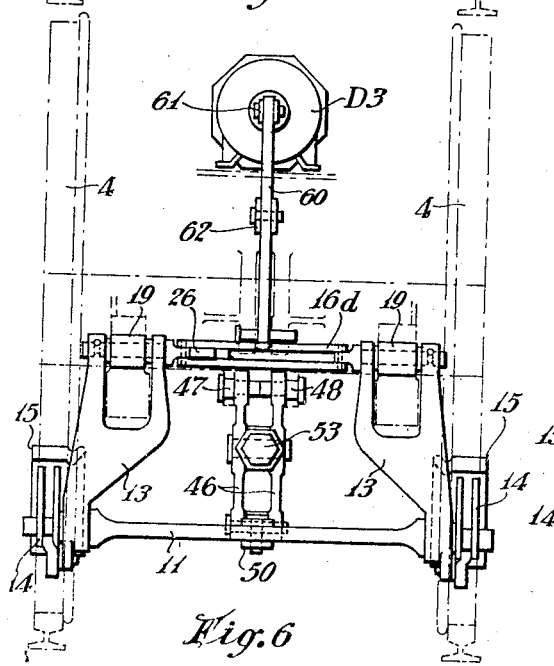
Figure 7:
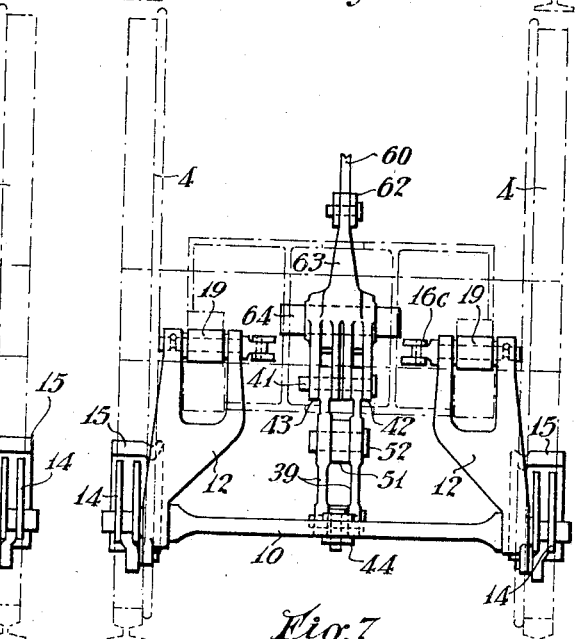
Figure 5:

In the accompanying drawings, Figs. 1A and 1B are views, partly diagrammatic and partly in side elevation, which when placed end to end with Fig. 1A on the left show one form of brake rigging embodying my invention applied to the driving wheels of a locomotive having four pairs of driving wheels. Figs. 2A and 2B are top plan views of the brake rigging shown in Figs. 1A and 1B, respectively, certain of the parts being omitted for the sake of clearness. Fig. 3 is an end elevation of a portion of the brake rigging associated with the pair of driving wheels 2 in Fig. 1B as it appears when viewed from the right in Fig. 1B. Fig. 4 is an end elevation of a portion of the brake rigging associated with the front pair of driving wheels 2 in Fig. 1B as it appears when viewed from the left in Fig. 1B. Fig. 5 is a detail view showing a lever 59 associated with the brake mechanism for the second pair of driving wheels 3. Fig. 6 is an end elevation of a portion of the brake rigging associated with the third pair of driving wheels 4 shown in Fig. 1A as it appears when viewed from the right in Fig. 1A. Fig. 7 is an end elevation of a portion of the brake rigging associated with the third pair of driving wheels 4 shown in Fig. 1A as it appears when viewed from the left in Fig. 1A.

Similar reference characters refer to similar parts in each of the several views.

Referring to the drawings, I have here shown my invention applied to a locomotive having a suitable frame 1 which may, for example, be of the bar type, and four pairs of driving wheels, 2, 3, 4 and 5 which I shall term for convenience front, second, third and back pairs of driving wheels, respectively. Each pair of driving wheels is mounted on an axle comprising a part of a roller bearing axle assembly the construction of which forms no part of my present invention, and is therefore not shown in detail in the drawings. It should be particularly pointed out, however, that the axle assemblies for the front and third pairs of driving wheels are each suitably journaled at each end in a journal box (not shown) which is guided by spaced pedestal jaws 6 formed in the side member of the frame in such manner that the journal box is free to slide both vertically and laterally with respect to the frame, and each axle assembly includes a member 7 which connects the two journal boxes and which is movable laterally therewith. This member may assume a variety of forms depending upon the particular type of roller bearing construction employed, and is here shown as being tubular in construction. This member is referred to in the art by a variety of different designations, but for convenience I shall hereinafter refer to it as an axle housing, although it should be distinctly understood that insofar as my present invention is concerned its exact construction is immaterial so long as it is a non-rotatable member which moves laterally in response to lateral movement of the associated driving wheels. Each housing 7 is provided at its central portion with two pairs of laterally projecting lugs 7a and 7b for a purpose which will appear presently. It should be here noted that the wheel and axle assemblies just described differ from the two remaining wheel and axle assemblies in that these assemblies are movable laterally with respect to the locomotive frame through a distance sufficient to permit the wheels to follow the track rails on curves without causing undue side thrust of the flanges of one or the other of the wheels on the adjacent rails, this distance in actual practice usually being about one inch in either direction from the normal central position.

The brake rigging comprises four separate brake mechanisms one of which is associated with each pair of driving wheels. For the most part all four of these mechanisms are similar, but each of these mechanisms differs in certain minor respects from each of the other mechanisms, and I shall therefore, in the interest of brevity, first describe the mechanism associated with the front pair of driving wheels, and shall then point out the manner in which the other mechanisms differ from this mechanism.

Referring now to the mechanism associated with the front pair of driving wheels 2, this mechanism comprises two brake beams 10 and 11 which extend transversely of the wheels considerably below the horizontal planes passing through their centers, and which are pivotally connected at their opposite ends with vertically disposed hangers 12 and 13, respectively. Each brake beam is also provided at each end with a brake head 14 carrying a brake shoe 15 for co-operation with the periphery of the associated wheel.

As best seen in Figs. 3 and 4, the upper end of each hanger 12 and 13 is offset inwardly from the lower end for clearance reasons, and is provided with spaced bifurcations 12a or 13a, as the case may be, which bifurcations are apertured to receive an associated supporting pin 16. Each pin 16 is provided adjacent its inner end with an annular shoulder 16a adjacent which the one bifurcation of the associated hanger abuts, and at the other end with an annular groove 16b which receives with some clearance a pin 17 passing through the arm, whereby the hanger is prevented from moving longitudinally relative to the pin, but is free to rotate about the pin. Disposed on each pin 16 between the associated bifurcations 12a or 13a is a bearing sleeve 18 which is slidable longitudinally, within a bushed bearing 19 formed in the adjacent side member of the locomotive frame, through a distance equal to the total permissible lateral movement of the driving wheels relative to the locomotive frame. It will be seen, therefore, that with the brake beams 10 and 11 supported in the manner just described, these brake beams are free to swing toward and away from the wheels 2 into braking and non-braking positions, and are also free to move laterally along with the associated hangers and supporting pins through a distance equal to the lateral distance which the wheels are permitted to move.

The inner ends of the pins 16 which support the hangers 12 are flattened and are connected together by a composite tie rod 16c comprising two flat bars secured at their ends to the opposite sides of the pins. A block 20 of metal is fastened between the two bars of the tie rod 16c adjacent one end thereof in a manner to form with the end of the associated pin 16a a socket 21, and extending into this socket is one end of an arm 22 (see Fig. 2B), the other end of which is attached to the axle housing by means of pivot pins 23 mounted in the lugs 7a in such manner that this arm is free to rotate about the pivot pins in a vertical plane. It will be apparent that with this construction any lateral motion of the wheels will be transmitted through the housing 7 and the arm 22 to the tie rod 16c, and from the tie rod 16c through the pins 16, the hangers 12 and the brake beam 10 to the associated brake shoes 15, whereby the brake shoes will be maintained at all times in lateral alignment with the wheels 2.

The inner ends of the pins 16 which support the hangers 13 are likewise flattened and are connected together by a composite tie rod 16d similar to the tie rod 16c. The tie rod 16d is provided with a socket 25, and extending into this socket is one end of an arm 26 (see Fig. 2B), the other end of which is pivotally attached to the axle housing by means of pins 27 mounted in the lugs 7b, whereby the brake beam 11, and hence the associated brake shoes 15 are constrained to follow the lateral motion of the wheels 2.

The brake mechanism associated with the driving wheels 2 also comprises means for actuating the brake beams 10 and 11 between their brake applying and brake releasing positions without interfering with the lateral movement of the brake beams in response to the lateral movement of the wheels in either the applied or released positions of the brake beams. As here illustrated, these means comprise a brake cylinder D1 which is bolted directly to the engine frame some distance above, and in rear of the axis of the wheels 2, in vertical alignment with the longitudinal center line of the locomotive. This brake cylinder is of well-known construction, and includes the usual cylinder body, reciprocable piston (not shown) biased to the inner end of its stroke by the usual release springs (not shown), and a push rod 30 which is operatively connected with the piston.

The outer end of the push rod 30 is operatively connected, through the medium of a horizontal lever 31 and a pair of pull rods 32 and 33, with the upwardly extending arms or bifurcations 34a and 34b of a brake cylinder lever 34 which is made Y-shaped for clearance reasons. The horizontal lever 31 is slidably supported adjacent its ends by a pair of lever supports 35 which are secured at one end to the locomotive frame and at the other end to an inverted U-shaped bracket 36 which latter is also secured to the locomotive frame.

The brake cylinder lever 34 is pivoted intermediate its ends on a pin 37 mounted in a pair of spaced lugs 38 formed on the locomotive frame, and is pivotally connected at its lower ends with a pair of intermediate levers 39 by means of a pin 41 mounted in spaced lugs 42 and 43 formed on the lower end of the lever 34. The intermediate levers 39, in turn, are operatively connected at their lower ends with the brake beam 10 at or near its center through the medium of a double jaw 44, and are operatively connected intermediate their ends with one end of a pull rod 45, the other end of which is pivotally connected with a similar pair of intermediate levers 46 intermediate their ends. The intermediate levers 46 are pivoted at their upper ends on pins 47 and 48 mounted in depending lugs provided on the engine frame, and are operatively connected at their lower ends with the brake beam 11 at or near its center through the medium of a double jaw 50 similar to the double jaw 44. The pull rod 45 is provided at the end which is connected with the intermediate levers 39 with an eye 51 which receives a pin 52 passing through these levers, and at the opposite end with a slack adjuster 53 of well-known construction. Sufficient lost motion is provided in the linkage to permit the necessary lateral motion of the brake beams.

When no fluid is being supplied to the brake cylinder D1, as will normally be the case, the brake beams 10 and 11 are held in their released positions in which they are shown in the drawing by the release spring mounted in the brake cylinder, and under these conditions the brake shoes exert substantially no braking effort on the wheels.

When it is desired to effect a brake application, fluid is supplied to the brake cylinder D1, thereby causing the push rod 30 to move outwardly in the cylinder in opposition to the bias of the release spring. This outward movement of the push rod acts through the lever 31 and pull rods 32 and 33 to rotate the brake cylinder lever 34 in a clockwise direction, as viewed in Fig. 1B, which rotation, in turn, acts through the intermediate levers 39 and the double jaw 44 to move the brake beam 10 to its brake applying position, and through the pull rod 45, intermediate levers 46 and double jaw 50 to move the brake beam 11 to its brake applying position.

When the brake beams are in either their release or brake applying positions, if lateral movement of the wheels 2 takes place, this movement will be transmitted through the arms 22 and 26, the composite tie rods 16c and 16d, the pins 16, and the hangers 12 and 13 to the brake beams 10 and 11 in the manner previously pointed out, and from the brake beams to the brake shoes 15, whereby the brake shoes are always maintained in lateral alignment with the wheels. If desired, the brake shoes 15 may be of the grooved type to assist in maintaining the shoes in alignment with the wheels.

Referring now to the brake mechanism associated with the driving wheels 3, inasmuch as these driving wheels are not permitted to move laterally relative to the engine frame, it is unnecessary to provide for any lateral motion of the brake beams associated with these wheels, and as a result, the hangers 13 which support the brake beam 11, instead of being supported at their upper end on pins which are slidably mounted in the engine frame, are mounted at their upper ends on pins 56 which are free to rotate relative to the frame but which are held in a fixed longitudinal position relative to the frame. Furthermore, inasmuch as there is more clearance at the rear sides of the wheels 3 than at the rear sides of the wheels 2, the brake beam 10 instead of being supported by hangers similar to the hangers 12 which support the brake beams 10 associated with the wheels 2 are supported by hanger levers 57 of the usual and well-known construction, which hanger levers are pivotally attached at their upper ends to the locomotive frame by means of pins 58, and which hanger levers are provided with upwardly extending forwardly offset projections 14a to which the brake heads 14 are attached. The brake mechanism further differs from that for the wheels 2 in that the pull rod 45 instead of being connected with the brake beam 10 through a pair of levers 46 and double jaw 50 is connected with this brake beam through the medium of a single lever 59 (see Fig. 5) and the double jaw 50.

The remainder of the brake mechanism associated with the wheels 3 is similar in all respects to that associated with the wheels 2, and its operation will be readily apparent from the foregoing and from an inspection of the drawings without further detailed description.

Referring next to the brake mechanism for the third pair of driving wheels 4, as here shown this brake mechanism is actuated by a brake cylinder D3, the push rod 30 of which is connected through the medium of a double jaw 61 with the upper end of a vertical brake cylinder lever 60. The cylinder lever 60 is pivotally attached at its lower end to the engine frame and is operatively connected intermediate its end through the medium of a pull rod 62 with the upper end of an intermediate lever 63. The intermediate lever 63, in turn, is pivotally supported intermediate its end on a pivot pin 64 mounted in the engine frame, and is pivotally connected at its lower end (see Fig. 7) with the upper ends of the levers 39 in a manner similar to that in which the brake cylinder lever 34 of the brake mechanism associated with the driving wheel 2 is connected with the levers 39 of that brake mechanism. The remainder of the brake mechanism associated with the driving wheel 4 is similar in all respects to that associated with the driving wheel 2, and its operation will be readily understood from the drawings and from the foregoing description without further detailed description.

Referring now to the brake mechanism associated with the driving wheels 5, this mechanism is similar to that associated with the driving wheels 4 except for the means for supporting the brake beams 10 and 11 which means are similar to that for supporting the brake beams 10 and 11 of the mechanism associated with the wheels 3.

Although I have herein shown and described only one form of brake rigging embodying my invention, it is understood that various changes and modifications may be made therein within the scope of the appended claims without departing from the spirit and scope of my invention.

Having thus described my invention, what I claim is:

1. In a brake mechanism for a railway vehicle, the combination of a brake cylinder secured to the vehicle frame and having a piston movable therein, a horizontal lever connected intermediate its ends with said piston, and a vertically disposed Y-shaped brake cylinder lever pivotally secured to the vehicle frame and having its two arms operatively connected with the ends of said horizontal lever.

2. In a brake mechanism for a railway vehicle, the combination of a brake cylinder secured to the vehicle frame and having a piston movable therein, a horizontal lever connected intermediate its ends with said piston, and a vertically disposed Y-shaped brake cylinder lever pivotally secured to the vehicle frame and having its two arms operatively connected with the ends of said horizontal lever by means of pull rods.

3. In a brake mechanism for a railway vehicle, the combination with the vehicle frame and a wheel and axle assembly cooperating therewith, of a brake cylinder secured to said frame and having a piston movable therein, a horizontal lever connected intermediate its ends with said piston, a vertically disposed Y-shaped brake cylinder lever pivotally attached to said frame and having its upwardly extending arms connected with the opposite ends of said horizontal levers by means of pull rods, and means connected with the lower end of said brake cylinder lever for applying clasp brakes to the wheels of said wheel and axle assembly.

4. In a brake mechanism for a railway vehicle, the combination with the frame and a pair of wheels cooperating therewith, of a brake cylinder secured to the frame between the wheels and having a piston movable therein, a horizontal lever connected intermediate its ends with said piston, a forked brake cylinder lever pivotally secured to said frame and having its arms connected with the opposite ends of said horizontal lever, two brake beams one disposed on each side of said pair of wheels, and means for connecting said brake beams with said brake cylinder lever.

5. In a brake mechanism for a railway vehicle, the combination with the frame and a pair of wheels cooperating therewith, of a brake cylinder secured to the frame between the wheels and having a piston movable therein, a horizontal lever connected intermediate its ends with said piston, a forked brake cylinder lever pivotally secured to said frame and having its arms connected with the opposite ends of said horizontal lever, two brake beams one disposed on each side of said pair of wheels, a first intermediate lever connected at one end with said brake cylinder lever and at the other end with one of said brake beams, and a second intermediate lever pivotally attached at one end to said frame and connected at the other end with the other brake beam and connected intermediate its ends with said first intermediate lever.

6. In a brake mechanism for a railway vehicle, the combination with the frame and a pair of wheels cooperating therewith, of a brake cylinder secured to the frame between the wheels and having a piston movable therein, a horizontal lever connected intermediate its end with said piston, a forked brake cylinder lever pivotally secured to said frame and having its arms connected with the opposite ends of said horizontal lever, two brake beams one disposed on each side of said pair of wheels, a first intermediate lever connected at one end with said brake cylinder lever and at the other end with one of said brake beams, and a second intermediate lever pivotally attached at one end to said frame and connected at the other end with the other brake beam and connected intermediate its ends with said first intermediate lever by means of a pull rod including a slack adjuster.

7. In a brake mechanism for a railway vehicle, the combination with the vehicle frame and a pair of wheels cooperating therewith, of two brake beams one disposed on each side of said pair of wheels, a vertically disposed lever pivotally attached intermediate its ends to said frame, a pair of intermediate levers pivotally connected at one end with said vertically disposed lever and operatively connected at the other end with said brake beam, a third intermediate lever pivotally attached at one end to said frame and operatively connected at the other end with the other brake beam, a pull rod connected with said third intermediate lever intermediate its ends and with said pair of intermediate levers intermediate their ends, and means connected with said vertically disposed lever for actuating it.

8. In a brake mechanism for a railway vehicle, the combination with the vehicle frame and a pair of wheels cooperating therewith, of two brake beams one disposed on each side of said pair of wheels, a first pair of intermediate levers pivotally attached at one end to said frame and operatively connected at the other end with said brake beam at its center by means of a double jaw, a second pair of intermediate levers operatively connected at one end with the other brake beam at its center by means of a double jaw and operatively connected intermediate their ends by a pull rod with the levers of said first pair intermediate their ends, a Y-shaped vertically disposed brake cylinder lever pivotally mounted on the engine frame and pivotally connected at its lower end with the free ends of said second pair of intermediate levers, a brake cylinder secured to said frame and having a piston movable therein, and a horizontal lever connected intermediate its ends with said piston and at its ends with the two arms respectively of said brake cylinder lever.

9. In a brake mechanism for a railway vehicle, the combination of a brake cylinder secured to the vehicle frame and having a piston movable therein, a vertically disposed brake cylinder lever pivotally attached at its lower end to said frame and operatively connected at its upper end with said piston, and a second vertically disposed lever pivotally attached intermediate its ends to said frame and operatively connected at its upper end with said brake cylinder lever intermediate its ends and operatively connected at its lower end with brake applying means.

10. In a brake mechanism for a railway vehicle, the combination with the vehicle frame and a pair of wheels cooperating therewith, of a brake cylinder secured to said frame and having a piston movable therein, a vertically disposed brake cylinder lever pivotally attached at its lower end to said frame and operatively connected at its upper end with said piston, a second vertically disposed lever pivotally attached intermediate its ends to said frame and operatively connected at its upper end with said brake cylinder lever intermediate its ends, and means for applying clasp brakes to said wheels operatively connected with the lower end of said second lever.

11. In a brake mechanism for a railway vehicle, the combination with the vehicle frame and a pair of wheels cooperating therewith, of a brake cylinder secured to said frame and having a piston movable therein, a vertically disposed brake cylinder lever pivotally attached at its lower end to said frame and operatively connected at its upper end with said piston, a second vertically disposed lever pivotally attached intermediate its ends to said frame and operatively connected at its upper end with said brake cylinder lever intermediate its ends, two brake beams one disposed on each side of said pair of wheels, and two intermediate levers connected together intermediate their ends and each connected at one end with the center of a different one of said brake beams and one connected at the other end with the lower end of said second vertically disposed lever and the other pivotally attached at its other end to said frame.

EMIL G. MUELLER.